United States Patent [19]

Butler et al.

[11] Patent Number: 4,927,440
[45] Date of Patent: May 22, 1990

[54] THRASHING SYSTEM FOR VEGETABLE HARVESTERS

[75] Inventors: Lee D. Butler, Kingsburg; Franklin P. Orlando, Morgan Hill; Don H. Lenker, Salinas, all of Calif.

[73] Assignee: FMC Corporation, Chicago, Ill.

[21] Appl. No.: 288,838

[22] Filed: Dec. 23, 1988

[51] Int. Cl.$^5$ ............................................. A01D 45/00
[52] U.S. Cl. ..................... 56/12.8; 56/327.1; 56/13.9; 56/330; 56/DIG. 2; 460/130
[58] Field of Search ............... 460/123, 130, 134, 143, 460/149, 100; 56/12.9, 13.1, 13.2, 14.1, 13.9, 126, 327.1, 330, DIG. 2; 99/516, 546, 635, 640; 171/27, 28

[56] References Cited

U.S. PATENT DOCUMENTS

| | | | |
|---|---|---|---|
| 2,911,978 | 11/1959 | Morrison | 460/130 |
| 3,518,818 | 7/1970 | Porter | 56/327.1 |
| 3,527,304 | 9/1970 | Wilde et al. | 56/327.1 X |
| 3,552,398 | 1/1971 | Looker | 460/130 |
| 3,603,067 | 9/1971 | Wilde | 56/327.1 |
| 3,916,913 | 11/1975 | Looker et al. | 460/130 |
| 4,335,570 | 6/1982 | Fitzmaurice | 56/327.1 |
| 4,524,572 | 6/1985 | Wilde et al. | 56/327.1 |

*Primary Examiner*—Jerome W. Massie
*Assistant Examiner*—Matthew Smith
*Attorney, Agent, or Firm*—A. J. Moore; R. C. Kamp; R. B. Megley

[57] ABSTRACT

A thrashing system for a vegetable harvester including a plurality of tines on an oscillating shaker head which engage vines and shake the fruit such as cucumbers, from the vines. The fruit is collected on a cross conveyor and the vines are pulled through at least one pair of pinch rolls for discharge on the ground. A full width blower directs high pressure air across the cross conveyor to lift and spread the vines allowing disconnected fruit to fall therethrough onto the cross conveyor.

20 Claims, 4 Drawing Sheets

FIG_1
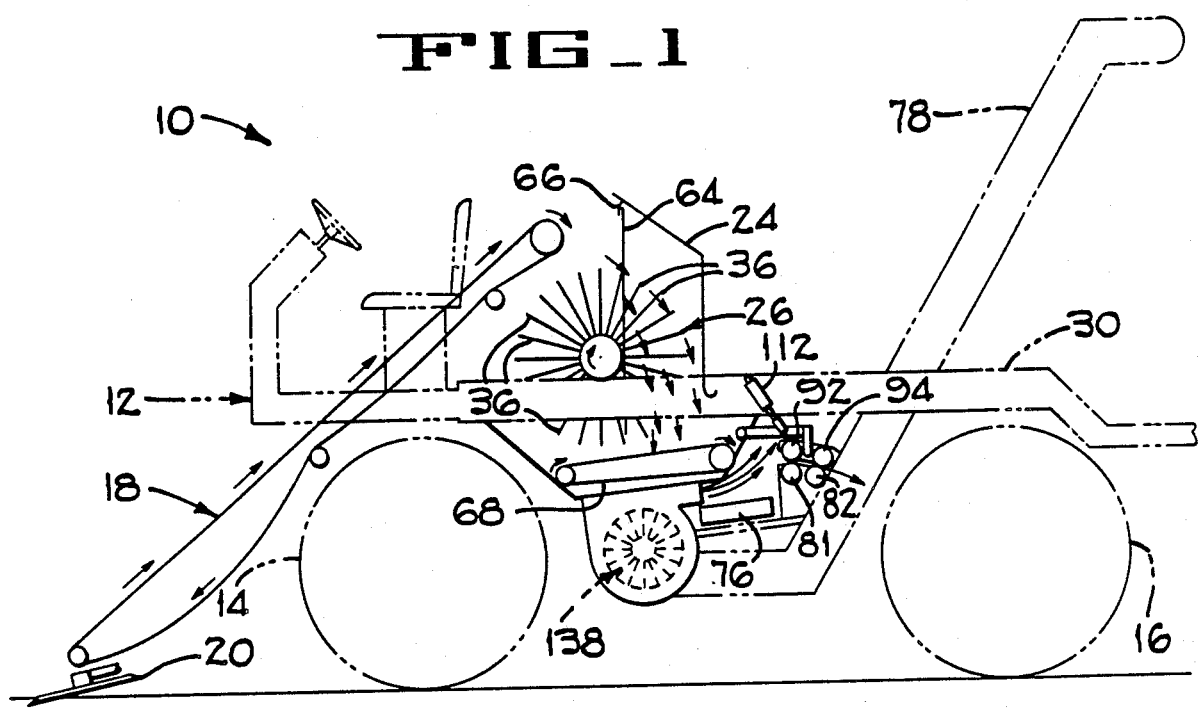
FIG_2
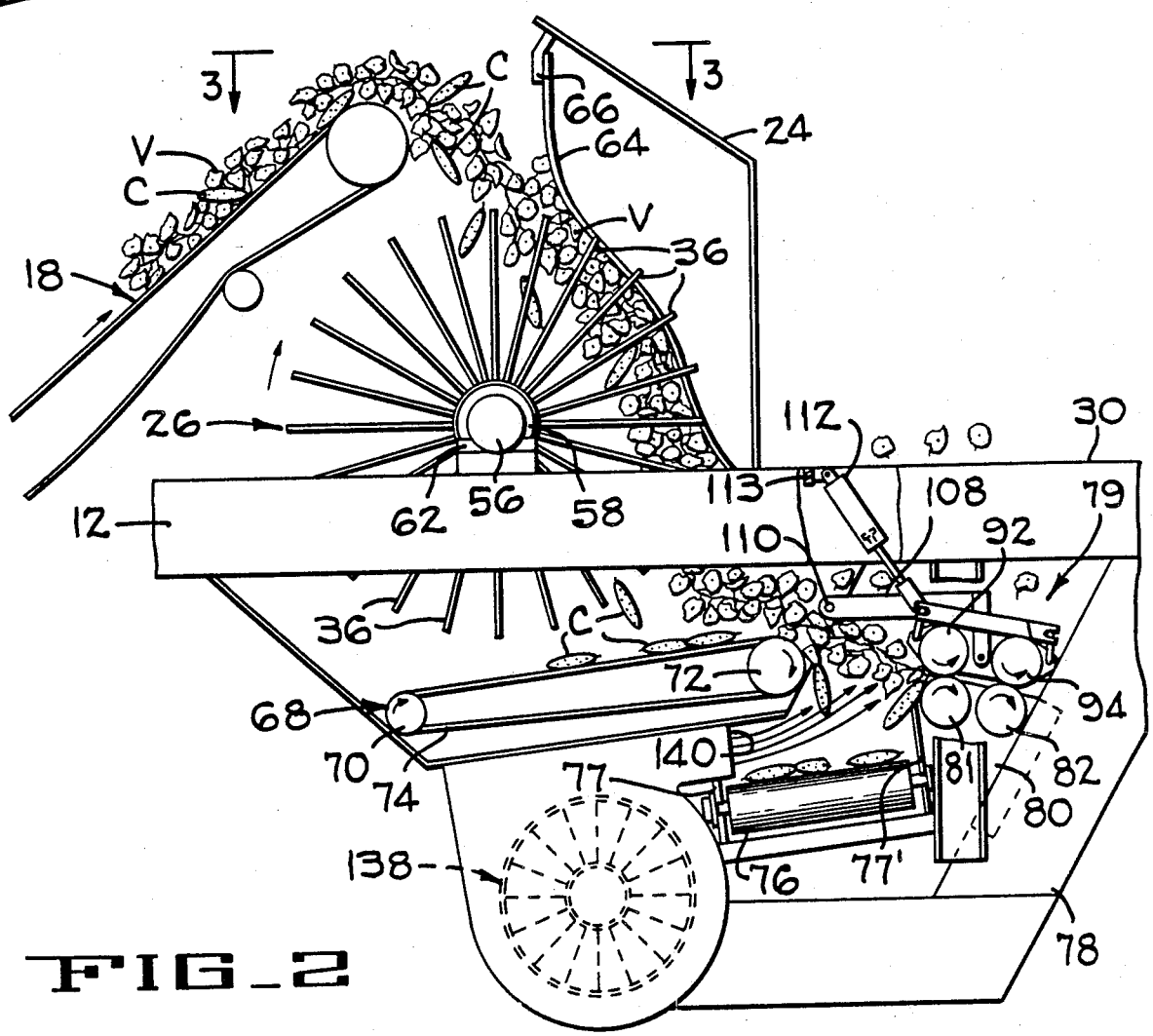

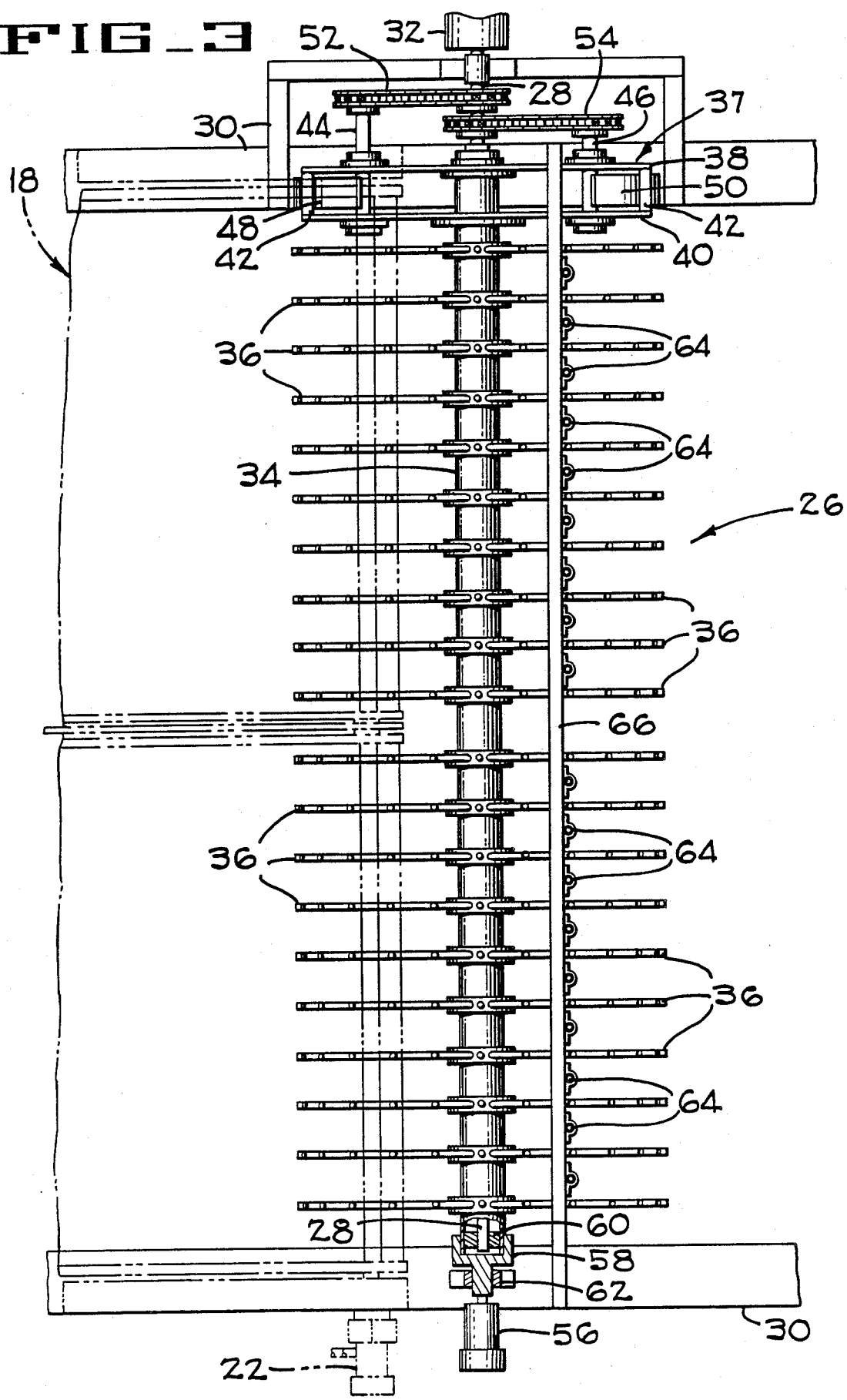

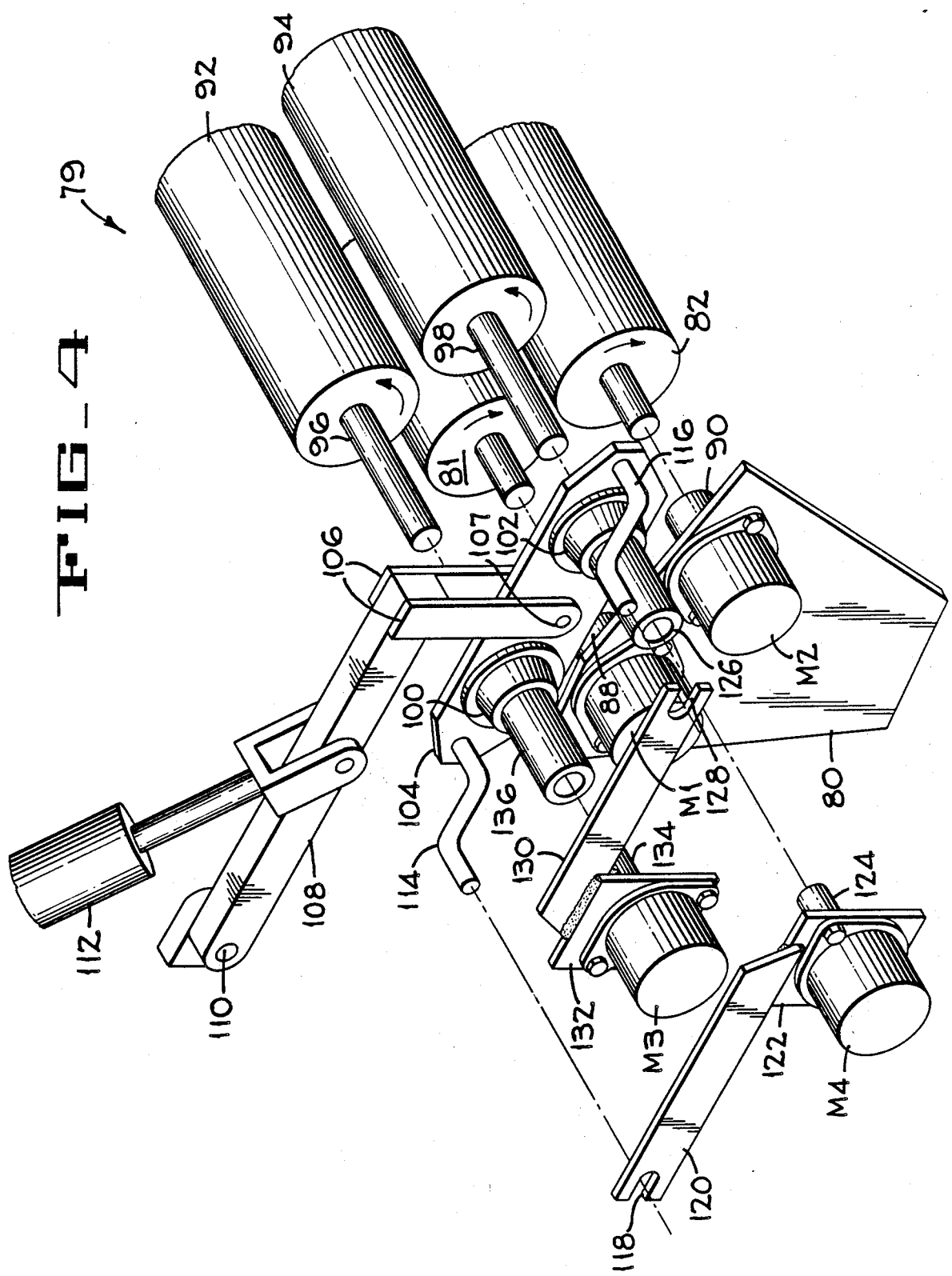

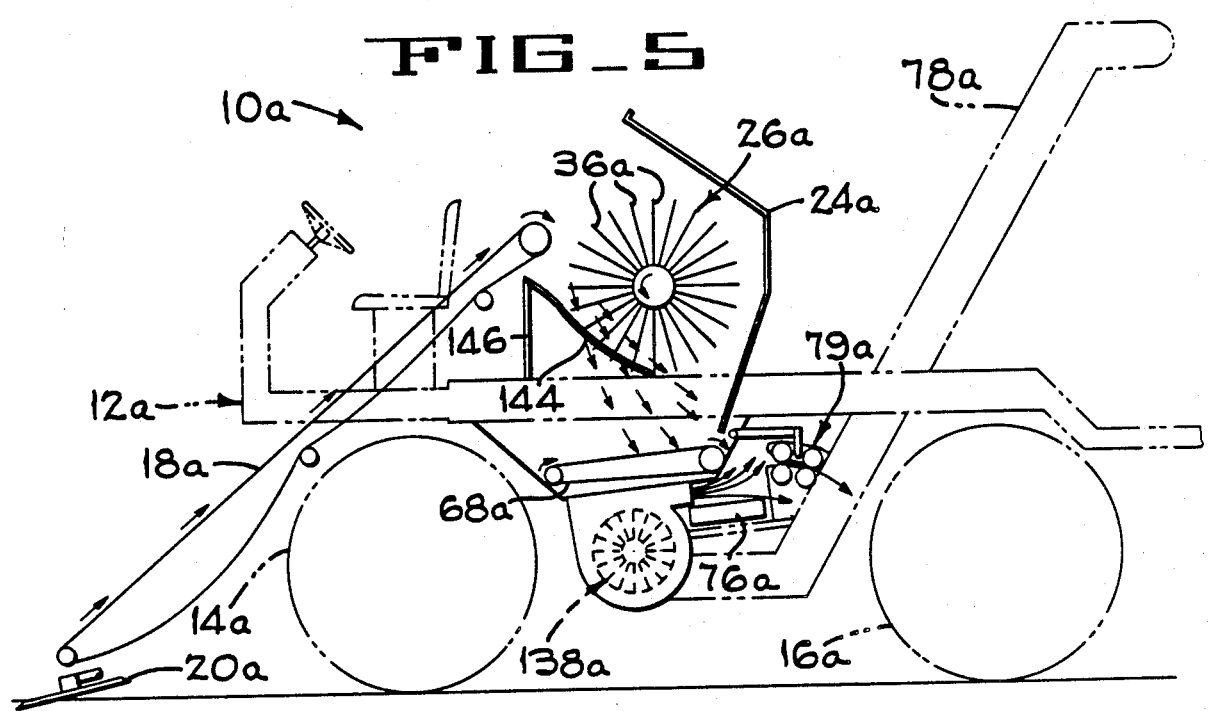
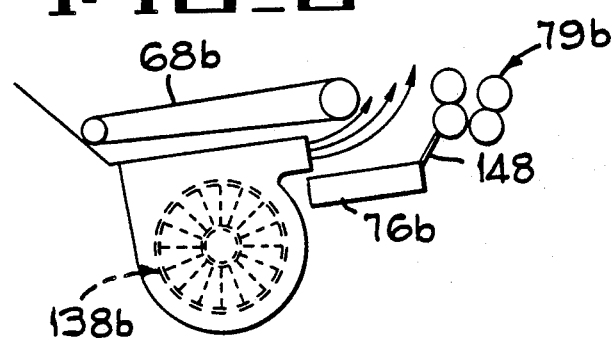
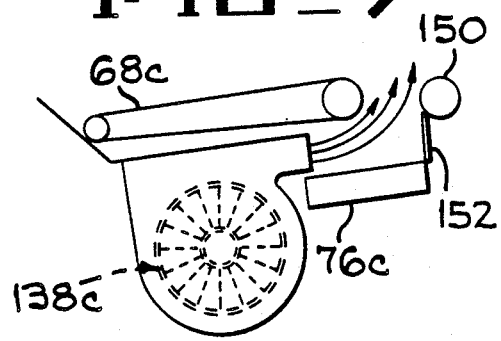
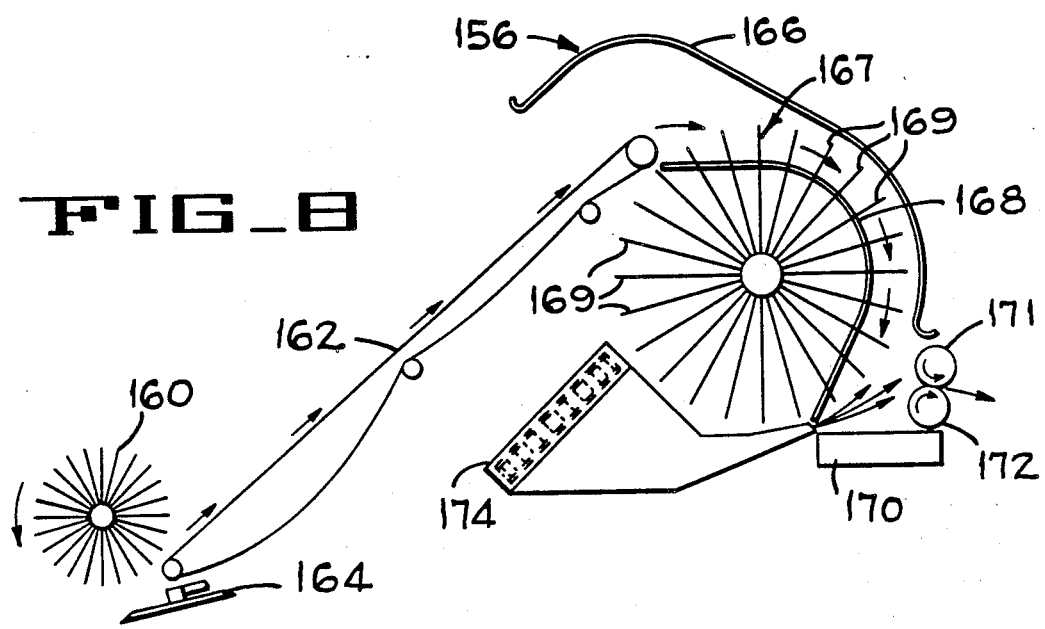

THRASHING SYSTEM FOR VEGETABLE HARVESTERS

CROSS REFERENCE TO RELATED APPLICATIONS

The present application relates to Butler et al application Ser. No. 286,831 filed on Dec. 20, 1988 (pending) and entitled Plant Harvester.

BACKGROUND OF THE INVENTION

1. Field of the Invention

The present invention relates to self propelled vegetable harvesters and more particularly pertain to a thrashing system and method in a cucumber harvester for separating cucumbers from their vine.

2. Description of the Prior Art

Mobile vegetable harvesters are well known in the art for harvesting and separating vegetables from their vines or foliage. One such harvester for harvesting tomatoes is disclosed in Assignee's Fitzmaurice U.S. Pat. No. 4,335,570 which issued on June 22, 1982.

SUMMARY OF THE INVENTION

The thrashing system includes a rotating vibratory thrasher having a plurality of flexible fingers which receive the foliage or vines of a plant severed from the ground and shake substantially all of the fruit of the plant free from the foliage. Most of the fruit is separated from the plants by the shaker with the fruit being collected on a fruit conveyor which is substantially equal in width to the width of the harvester. In different embodiments of the invention, the foliage may be urged outwardly or inwardly of the rotary thrasher; and several types of air blasts from blowers are employed to lift and separate the foliage for dislodging the fruit from the vines. Single or double pairs of foliage gripping rollers may be used to pull the vines through the harvester and to disconnect the very minor portion of the fruit which is not separated from the vine by the thrasher.

BRIEF DESCRIPTION OF DRAWINGS

FIG. 1 is a diagrammatic longitudinal central section of portions of a cucumber harvester illustrating a first embodiment of the thrashing system of the present invention.

FIG. 2 is an enlarged central section of certain thrashing components of the harvester illustrating resilient vine guides.

FIG. 3 is an enlarged plan view of the foliage engaging components of the thrashing system looking in the direction of arrows 3—3 in FIG. 2.

FIG. 4 is an exploded perspective of one end portion of two pair of cooperating upper and lower pinch rolls illustrating torque arms for relieving stresses on the upper motors.

FIG. 5 is a diagrammatic longitudinal central section of a second embodiment of an invention with a thrashing rotor driven in the opposite direction relative to that of the first embodiment.

FIG. 6 is a side elevation illustrating a modified blower and baffle which directs a blast of high pressure air upwardly between a fruit conveyor and foliage pinch rolls, and also across a cross conveyor.

FIG. 7 is a side elevation illustrating a blower and baffle which directs high pressure air upwardly between the fruit conveyor and a single full width idler roller.

FIG. 8 is a diagrammatic elevation of a third embodiment of the invention illustrating an inline blower and outer and inner guides for guiding the foliage and fruit around the thrashing rotor.

DESCRIPTION OF THE PREFERRED EMBODIMENT

A self propelled harvester 10, such as a cucumber harvester, is diagrammatically illustrating in FIG. 1 and includes a chassis 12 supported on two pair of wheels 14,16. An inclined pickup conveyor 18 is supported on the chassis 12 and receives vines or foliage V (FIG. 2) and the attached crops such as cucumbers C, which vines are cut from the ground by a plurality of driven vine cutters 20 (only one being shown); or alternately by a transversely elongated cutter blade (not shown) which extends the full width of the harvester and is supported by the inclined pickup conveyor. In response to driving the harvester 10 through the field to be harvested, the vines V and cucumbers C are received by the conveyor 18, which is driven by a hydraulic motor 22 (FIG. 3), and are discharged within a bin 24 upon a thrashing or shaker head 26 (FIG. 2 and 3).

The shaker head 26 is substantially the same as that disclosed in the aforementioned Fitzmaurice U.S. Pat. No. 4,335,570. More particularly, the shaker head includes a drive shaft 28 (FIG. 3) journaled on a frame 30 supported by the chassis 12 of the harvester. The drive shaft is coupled to and driven by a hydraulic motor 32 (only a portion being shown). An elongated tubular shaft 34 is freely journaled on the shaft 28 and has a plurality of vine engaging tines 36 projecting radially outward therefrom. It will be noted that the tines of the shaker head 26 are driven in the direction of the arrow (FIGS. 1 and 2) so that the vines move over the top of the shaker head 26 above the axis of the shaker head.

An eccentric weight assembly 37 (FIG. 3) includes a pair of spaced, generally rectangular plates 38,40 rigidly secured to the tube 34 and having their corners connected together by spacer bars 42 for strengthening the assembly. A pair of shafts 44,46 are journaled in plates 38,40 and have 180° offset eccentric weights 48,50 rigidly secured thereto. Chain drives 52,54 are of equal drive ratios and are connected between the drive shaft 28 and the shafts 44,46, respectively, thereby driving the weights at the same speed during operation of the harvester thus causing an oscillatory or vine shaking motion to the tines. It will be apparent that the speed of rotation of the eccentric weights 48,50 is substantially independent of the rotation, if any, of the tubular shaft 34 since the tubular shaft rotates freely with respect to the drive shaft 28. The eccentric weights rotate as a component of the tubular shaft 34 which is journaled on the driven shaft 28. However, the oscillatory motion imparted by the weights is much greater than the motion due to frictional force between the tubular shaft and the driven shaft 28, thus the motion of the tines is basically an oscillatory motion with very little tendency to rotate in the direction of rotation of the driven shaft 28.

A hydraulic motor 56 is coupled to the tubular shaft 34 by a coupling 58. A bearing 60 within the adjacent end of the shaft 34 rotatably receives the end of the driven shaft 28, and a second bearing 62 rotatably supports a small kiameter portion of the coupling 58. Thus the motor 56 allows the shaft 34 to oscillate while positively causing the shaker head 26 to be driven in the direction of the arrows (FIGS. 1 and 2) over the top of the shaker head. The speed of rotation of the shaker head 26 and the movement of the vines can be controlled by regulating the amount of flow to the motor 56.

The hydraulic motor 56 (FIG. 3) is of the type that will slip internally to allow the motor shaft and coupling 58 to oscillate while positively allowing the tube and tines 36 to be oscillated by the motor 32. The motor 56 is a gear motor known as CHAR-LYNN-H Series Gerotor manufactured by Eaton Corporation, Fluid Power Operations, Eden Prairie, Minn.

The direction of rotation of the motor 32 is opposite to that of the shaker head 26 so that the rotational motion due to frictional forces between the tubular shaft 34 and the oscillating shaft 28 is opposed to that of the shaker head 26. This feature prevent "run-away" of the shaker head 26 and also results in a larger amplitude of the tines 36 resulting in a more aggressive shaking of the vines passing over the shaking head 26.

In order to assure that the vines and fruit are properly retained in the shaker head 26 and engaged by the oscillating tines 36, a plurality of flexible strips 64 are secured to a transverse bar 66 of the bin 24. The strips are formed from flexible materials such as rubber hose, belting, or plastic strips. As illustrated in FIGS. 1 and 3, when no vines and fruit are present, the strip 64 will be substantially vertical, but when the vines and fruit are moving therethrough the straps will bow outwardly in accordance with the volume of vines passing therethrough.

A driven fruit conveyor 68 is mounted within the lower portion of the bin 24 and extends substantially the full width of the bin. The fruit conveyor includes an elongated idler roll 70, an elongated driven roll 72, and a wide belt 74 trained thereover for receiving fruit such as cucumbers C along with debris, such as dirt, leaves and vine portions. The fruit and debris are discharged over the driven roll 72 onto a driven cross conveyor 76 which advances the fruit onto an elevator 78 for discharge into a truck or the like (not shown) as is conventional in the art. The cross conveyor 76 is supported on end rollers journaled on side walls 77 and 77', with the side wall 77' projecting upwardly to act as an air deflector and vine guide.

FIG. 4 illustrates the structure for mounting one end of two pair of pinch rolls of a pinch roll assembly 79 to the left wall 80 (only a fragment being shown) of the frame 30 of the harvester 10.

Two lower rollers 81,82 extend the full width of the harvester and are journaled in bearings (not shown) secured to the side wall 80 (only a fragment being shown) of the harvester. Hydraulic motors M1 and M2 are bolted to the side wall and are connected to the roll shafts by couplings 88,90. The motors M1 and M2 drive the lower rollers in the direction indicated by arrows.

Upper rollers 92,94 are secured to the shafts 96,98 which are journaled in bearings 100,102 bolted to a rocker arm 104 pivoted to a fork 106 by a pin 107 in a lever 108 that is pivoted to a side wall of the harvester at 110 (FIGS. 2 and 4). A hydraulic cylinder 112 is pivotally connected between the lever 108 and a portion of the frame at 113 (FIG. 2) and provide about 200 psi downward pressure against the lower pinch rolls 81,82 or vines therebetween. A conventional hydraulic circuit (not shown) with a four-way valve and a pressure relief valve set at about 200 psi is provided for applying and maintaining the desired pressure during harvesting, and for raising the rollers 92,94 about 3 inches above the lower rollers 81,82 for cleaning.

An important feature of the invention is that the torque arms 114,116 are welded to the rocker arm 104 for resiliently mounting the housings of the hydraulic motors M3,M4. This permits the motor housings to flex slightly when encountering heavy loads of vines passing between the four pinch rolls; and also permits the rocker arm 104 to raise to accommodate the load and to pivot about axis 107 as different amounts of vines pass between the upper and lower pinch bars.

As shown in FIG. 4, the torque arm 114 is received in a slot 118 in an arm 120 that is welded to a plate 122 to which the housing of the motor M4 is rigidly secured. Motor shaft 124 is connected to shaft 98 of the upper pinch roller 94 by a flexible coupling 126. Similarly, an end portion of the torque arm 116 is received in a slot 128 in the arm 130 that is welded to the mounting plate 132 of the motor M3. Motor shaft 134 is connected to shaft 96 of the pinch roll 92 by a coupling 136.

As best shown in FIG. 2, a driven blower 138 is mounted on the chassis 12 below the bin 24. The blower has an air outlet 140 extending the full width of the harvester for directing a blast of air above the cross conveyor 76 and upwardly through the vines V and cucumbers C for lifting the vines and blowing loose debris such as dirt, leaves and broken vines away from the harvester and cucumbers. The wall 77' aids in deflecting the air upwardly.

In operation of the vegetable harvester 10 (FIGS. 1-4) of the first embodiment of the invention, the harvester is driven through the field being harvested. When harvesting cucumbers C, the vines or foliage is preferably cut, although in loose or wet soil the vines may be pulled from the soil without cutting, and the crop along with the vines is moved upwardly by the conveyor 18 and are deposited within the bin 24 on the tines 36 which are oscillated thereby releasing substantially all of the cucumbers from the vines V, which released cucumbers fall on the driven fruit conveyor 68 and are discharged onto driven cross conveyors 76. The flexible straps 64 maintain the vines V in engagement with the tines while being thrashed. As the vines move toward the pinch rolls 92,81 and 94,82, a full width blast of air from blower 138 lifts and separates the vines while blowing debris upwardly off the cross conveyor 76. The vines V and a few cucumbers C then enter the first pair of pinch rolls 92, 81 which dislodges cucumbers C that remain attached to the vines. A vine gripping pressure of about 200 psi is applied to the two hydraulic cylinders 112 (only one being shown) to urge pinch rolls 92,94 downwardly thereby firmly gripping and pulling vines out of the harvester for discharge on the ground rearwardly of the harvester. The cucumbers on the cross-conveyor are conveyed onto the conventional elevator 78 for discharge into a truck (not shown) which is driven parallel to the harvester as is conventional in the art.

A second embodiment of the invention is illustrated in FIG. 5 and is similar to that of the first embodiment except that the shaker head 26a is driven in the opposite direction so that the tines 36a move in a counterclockwise direction as indicated by the arrow causing the vines to move below the axis of the shaker head.

Since the second embodiment of the invention is quite similar to that of the first embodiment, parts of the second embodiment which are equivalent to those of the first embodiment will be assigned the same numerals followed by the letter "a".

The self propelled harvester 10a (FIG. 5) includes a chassis 12a supported on two pair of wheels 14a and 16a. As the harvester is driven through the field of cucumbers or the like, horizontal vine cutter 20a cuts the vines. The vines and crop are then conveyed to the shaker head 26a by driven conveyor 18a for discharge into the bin 24a. The counterclockwise rotating shaker head 26a moves the vines and fruit over a plurality of spaced rods 144 (only one being shown) supported by a wall 146 so as to maintain the vines in engagement with the oscillating tines 36a while advancing the vines toward a pinch roll assembly 79a. The fruit that is shaken from the vines falls through the spaced rods 144 onto a fruit conveyor 68a which discharges the fruit onto a cross conveyor 76a. As in the first embodiment of the invention, the cross conveyor transports the fruit to an elevator 78a for discharge from the harvester 10a. The vines are pulled through the shaker head 26a by the pinch roll assembly 79a for discharge rearwardly of the harvester 10a. The harvester additionally differs from that of the first embodiment in that high pressure air from the blower 138a is not all deflected upwardly but allows a portion thereof to blow over the cross conveyor 76a which will assist in blowing dirt and debris rearwardly and downwardly of the harvester under the path of movement of the vines that pass through the pinch roll assembly 79a.

In operation of the second embodiment, the thrashing action of the shaker head 36a causes a major portion of the fruit, such as cucumbers, to fall between the rods 144 directly onto the fruit conveyor 68a thereby separating the major portion of the fruit from the vines. The vines and a small remaining portion of fruit are pulled against the pinch rolls of the pinch roll assembly 79a thereby causing most of the remaining fruit on the vines to fall onto the cross conveyor 76a. The full width blower blows sufficient air upwardly between the fruit conveyor 68a and the pinch roll assembly 79a thereby lifting and separating the vines before the vines enter the pinch roll assembly thus allowing the loose fruit supported on the vines to fall free from the vines onto the cross conveyor 76a. A portion of the air also flows over the cross conveyor and under the pinch roll assembly 79a thus discharging leaves and trash rearwardly of the harvester 10a. The relatively clean fruit on the cross conveyor 76a is transferred into the elevator 78a for discharge from the harvester into a truck or the like as is conventional.

FIG. 6 diagrammatically discloses a third embodiment of the invention illustrating an air control system wherein the full length blower 138b blows all of the air upwardly between the discharge end of the fruit conveyor 68b and the inlet end of the pinch roll assembly 79b thereby more effectively lifting and separating the vines allowing the fruit to more readily fall onto the cross conveyor 76b. A baffle 148 secured to the frame (not shown) of the cross conveyor 76b prevents loss of air between the cross conveyor and the pinch roll assembly 79b.

FIG. 7 diagrammatically discloses a blower 138c which discharges air between the discharge end of the fruit conveyor 68c and a freely rotatable roller 150 with a baffle 152 substantially preventing the air from discharging below the roller 150. This embodiment eliminates the need for pinch rolls thus allowing the vines to lift and separate more effectively thereby allowing the fruit to more readily fall through the vines onto the cross conveyor 76c.

FIG. 8 diagrammatically illustrates a fourth embodiment of the invention including only the fruit and vine handling components 156, with the harvester's body and frame being omitted. The fruit and vine handling components include a full width vine reel 160 driven in the direction of the arrow for advancing vines with fruit attached thereto onto the upper run of a driven conveyor 162 after the vines have been severed from the ground by a plurality of generally horizontal driven rotary cutters 164 (only one being shown).

The fruit and vines are discharged from the upper end of the conveyor 162 between an upper shield 166 and an inner shield 168. A plurality of transversely spaced slots (not shown) in an inner shield 168 are provided for receiving the tines 169 of a vine engaging reel 167. The inner shield 168 extends from below the upper end of the conveyor 162 to a position adjacent a driven cross conveyor 170 thereby eliminating the need of a fruit conveyor. The upper shield 166 extends from a position over the conveyor 162 to a position above a single pair of pinch rolls 171,172 which are driven in the direction of the arrows and are positioned adjacent the cross conveyor 170 for engaging the vines and discharging the vines upon the ground rearwardly of the harvester. A driven blower 174 directs an air blast that extends transversely substantially the full width of the harvester for separating the vines and allowing the fruit to fall directly onto the cross conveyor 170 for discharge into conventional means (not shown) for collecting the fruit.

From the foregoing description it is apparent that several embodiments of a thrashing system for a vegetable harvester have been disclosed. Each system uses an oscillating shaker head having a plurality of tines thereon which penetrate the vines for shaking substantially all of the cucumbers (or fruit) therefrom, which fruit is received on conveyors for collection. The vines are preferably drawn by at least one pair of driven pinch rolls which firmly grip the vines and release fruit that remain attached to the vines for discharge into the conveyors. A blower directs a high pressure blast of air across a cross conveyor for lifting and separating the vines allowing loose fruit laying on the vines to fall onto the cross conveyor and to discharge dirt, leaves and trash from the conveying system.

Although the best mode contemplated for carrying out the present invention has been herein shown and described, it will be apparent that modification and variation may be made without departing from that which is regarded to be the subject matter of the invention.

What is claimed is:

1. An apparatus for harvesting fruit attached to vines growing in the ground, comprising:
   means for moving a mobile harvester through the vines;
   means for elevating the vines and attached fruit from the ground;
   means defining an oscillating shaker head including a tubular shaft having a plurality of tines thereon, a pair of eccentric weights connected to said tubular shaft, first drive means for oscillating said eccentric weights, and second drive means connected to said tubular shaft for allowing the tubular shaft to oscillate while positively driving the shaker head in a desired direction;

means for releasing the vines and attached fruit onto tines of said oscillating shaker head for shaking a major portion of the fruit free from the vines while the shaker head is driven in a predetermined direction;

means for directing a blast of high pressure air against the vines and separate fruit for lifting and separating the vines for releasing the fruit therefrom;

means for collecting the fruit; and means for discharging the vines from the harvester.

2. An apparatus according to claim 1 and additionally comprising two pair of driven pinch rolls downstream of said oscillating shaker head for firmly gripping and pulling the vines out of said harvester for discharge on the ground, upper pinch rolls of each pair of rolls being journaled in rocker arms, upper motor means connected to said upper pinch rolls and supported by said rocker arms, torque arms having one end secured to associated ones of said upper motors and having slotted end portions slidably receiving associated ones of said rocker arms for allowing masses of vines of different thicknesses to pass between adjacent pairs of pinch rolls.

3. An apparatus according to claim 1 wherein said oscillating shaker head includes a tubular rotatable shaft to which said tines are secured and wherein the vines when engaged by the tines move over said shaft during oscillation of said oscillatory shaking head.

4. An apparatus for harvesting fruit attached to vines growing in the ground, comprising:

means for moving a mobile harvester through the vines;

means for elevating the vines and attached fruit from the ground;

means for releasing the vines and attached fruit on tines of an oscillating shaker head for shaking a major portion of the fruit free from the vines while the shaker head is moving in a predetermined direction;

means for directing a blast of high pressure air against the vines and separate fruit for lifting and separating the vines for releasing the fruit therefrom;

means for collecting the fruit;

means for discharging the vines form the harvester; wherein said oscillating shaker head includes a rotatable shaft to which said tines are secured and wherein the vines when engaged by the tines move over said shaft during oscillation of said oscillatory shaking head; and means for urging the vines downwardly toward said rotatable shaft for rotating the vines in engagement with said tines for a substantial arc around said axis for efficiently removing fruit from the vines in response to oscillation of the shaker head.

5. An apparatus according to claim 2 and additionally comprising means for urging the vines upwardly into the tines of said oscillating shaker head for maintaining the vines in engagement with said tines for efficiently removing fruit from the vines in response to oscillation of the shaker head.

6. An apparatus according to claim 1 and additionally comprising means for urging the vines downwardly toward said rotatable shaft for maintaining the vines in engagement with said tines for a substantial arc around said rotatable shaft for efficiently removing fruit from the vines in response to oscillation of the shaking head.

7. An apparatus for harvesting fruit attached to vines growing in the ground, comprising:

means for moving a mobile harvester through the vines;

means for elevating the vines and attached fruit from the ground;

means for releasing the vines and attached fruit on tines of an oscillating shaker head for shaking a major portion of the fruit free from the vines while the shaker head is moving in a predetermined direction;

means for directing a blast of high pressure air against the vines and separated fruit for lifting and separating the vines for releasing the fruit therefrom;

means for collecting the fruit;

means for discharging the vines from the harvester;

at least one pair of driven pinch rolls for firmly gripping and pulling the vines out of said harvester for discharge onto the ground;

said oscillating shaking head including a rotatable shaft to which said tines are secured and wherein the vines when engaged by the tines move over said shaft during oscillation of said oscillating shaker head; and means for urging the vines downwardly toward said rotatable shaft for maintaining the vines in engagement with said tines for a substantial arc around said rotatable shaft for efficiently removing fruit from the vines in response to oscillation of the shaking head; said means for urging said vines downwardly are transversely spaced flexible members.

8. An apparatus according to claim 7 wherein said means for urging the vines downwardly is an upper shield, and additionally comprising an inner shield having slots for receiving said tines and for guiding the released fruit onto a cross conveyor.

9. In a vegetable harvester having a chassis, a pinch roll assembly for gripping vines, comprising:

first and second lower pinch rollers journaled on said chassis;

first and second power means for driving said first and second lower pinch rolls in the same direction;

first and second transversely spaced rocker arms disposed above said first and second lower pinch rolls;

first and second transversely spaced lever arms journaled on said chassis and pivotally connected to said first and second rocker arms, respectively;

first and second hydraulic cylinders connected between said chassis and said first and second lever arms, respectively;

first and second upper pinch rolls journaled on said rocker arms and disposed in vine gripping position above said first and second lower pinch rolls;

third and fourth power means each having a housing and a shaft coupled in driving engagement to said first and second upper pinch rolls, respectively;

means defining first and second supporting arms having slots therein and being rigidly secured to the housings of said third and fourth power means respectively; and first and second torque arms rigidly secured to opposite end portions of associated ones of said rocker arms and having end portions movably received in associated ones of said slots, said first and second torque arms deflecting in response to abrupt high torques being applied to said third and fourth power means due to variations in the volume of foliage moving between said upper and lower pinch rolls.

10. An apparatus according to claim 9 wherein said hydraulic cylinders each apply about 200 pounds per square inch of downward force to each lever arm for maintaining a firm vine gripping force between said upper and lower pinch rolls.

11. An apparatus according to claim 9 wherein said rocker arms allow said first and second upper pinch rolls to pivot relative to said first and second lever arms in response to receiving vines of uneven thickness passing between said upper and lower rolls.

12. An apparatus according to claim 9 wherein said hydraulic cylinder is actuated to raise said upper pinch rolls above said lower pinch rolls to aid in cleaning said rolls.

13. An apparatus for harvesting fruit attached to vines growing in the ground, comprising:
means for moving a mobile harvester through vines in a forward direction;
means for elevating the vines and attached fruit from the ground;
means defining an oscillating shaker head including a drive shaft journaled within a tubular shaft having a plurality of resilient tines projecting outward relative to a generally horizontal axis;
means for guiding the vines and attached fruit into engagement with a portion of said tines for shaking a major portion of the fruit free from the vines;
first power means for driving said tubular shaft in a direction such that the tines advance the vines rearwardly of the harvester; and
second power means connected to said drive shaft and to eccentric weights rotatably supported by said tubular shaft for oscillating the shaking head, said second power means rotating in the opposite direction relative to the first power means.

14. An apparatus according to claim 13 and additionally comprising means for directing a blast of high pressure air against the vines and separated fruit for lifting and separating the vines for releasing the fruit therefrom.

15. A method of harvesting fruit attached to vines growing in the ground, comprising the steps of:
moving a mobile harvester through the vines;
elevating the vines and attached fruit;
releasing the vines and attached fruit on tines of an associated shaker head for shaking a majority of the fruit free from the vines while rotating in a predetermined direction;
continuously oscillating the tines while harvesting the fruit;
driving the portions of the tines in contact with the vines and fruit in a direction rearwardly of the direction of movement of the mobile harvester;
directing the vines and fruit into at least one pair of pinch rolls for separating the fruit from the vines and for gripping and pulling the vines out of the harvester for discharge on the ground;
directing a blast of high pressure air against the vines and separate fruit for lifting and separating the vines for releasing the fruit therefrom; and
separately connecting the fruit and discharging the vines from the harvester.

16. A method according to claim 15 wherein said oscillating shaking head is oscillated about an axis of rotation and wherein the vines move over said axis of rotation.

17. A method of harvesting fruit attached to vines growing in the ground, comprising the steps of:
moving a mobile harvester through the vines;
elevating the vines and attached fruit;
releasing the vines and attached fruit on tines of an oscillating shaker head for shaking a majority of the fruit free from the vines while rotating in a predetermined direction;
directing a blast of high pressure air against the vines and separated fruit for lifting and separating the vines for releasing the fruit therefrom;
separately collecting the fruit and discharging the vines from the harvester;
said oscillating shaking head is oscillated about an axis of rotation and wherein said vines move over said axis of rotation; and
urging the vines toward said axis of rotation for maintaining the vines in engagement with said tines for a substantial arc around said axis for efficiently removing fruit from the vines in response to oscillation of the shaking head.

18. A method of harvesting fruit attached to vines growing in the ground, comprising the steps of:
moving a mobile harvester through the vines;
elevating the vines and attached fruit;
releasing the vines and attached fruit on tines of an oscillating shaker head for shaking a majority of the fruit free from the vines while rotating in a predetermined direction;
directing a blast of high pressure air against the vines and separate fruit for lifting and separating the vines for releasing fruit therefrom;
separately collecting the fruit and discharging the vines from the harvester;
directing the vines through at least one pair of pinch rolls for firmly gripping and pulling the vines out of said harvester for discharge on the ground;
wherein said oscillating shaker head is oscillated about an axis of rotation and wherein the vines move over said axis of rotation; and
additionally comprising the step of urging the vines toward said axis for maintaining the vines in engagement with said tines for a substantial arc around said axis for efficiently removing fruit from the vines in response to oscillation of the shaking head.

19. A method of harvesting fruit attached to vines growing in the ground, comprising the steps of:
moving a mobile harvester through the vines;
elevating the vines and attached fruit;
releasing the vines and attached fruit on tines of an oscillating shaker head for shaking a majority of the fruit from the vines while rotating in a predetermined direction;
directing a blast of high pressure air against the vines and separated fruit for lifting and separating the vines for releasing the fruit therefrom;
separately collecting the fruit and discharging the vines from the harvester;
directing the vines through at least one pair of pinch rolls for firmly gripping and pulling the vines out of said harvester for discharge on the ground;
said oscillating shaking head being oscillated about an axis of rotation and wherein the vines and fruit move over said axis of rotation; and
confining the vines and fruit within a passage encompassing the outer end portions of the tines for more effectively shaking the vines and guiding the dislodged fruit for separately collecting the same.

20. A method of harvesting fruit attached to the vines growing in the ground, comprising the steps of:

moving a mobile harvester through the vines;

elevating the vines and attached fruit;

releasing the vines and attached fruit on tines of an associated shaker head for shaking a majority of the fruit free from the vines while rotating in a predetermined direction;

directing a blast of high pressure air against the vines and separated fruit for lifting and separating the vines for releasing the fruit therefrom;

separately collecting the fruit and discharging the vines from the harvester; said oscillating shaker head being oscillated about an axis of rotation and wherein the vines move under said axis of rotation; and urging the vines toward said axis of rotation for maintaining the vines in engagement with said tines for a substantial arc around said axis for efficiently removing the fruit from the vines in response to oscillation of the shaking head.

* * * * *